(12) United States Patent
Ramos et al.

(10) Patent No.: US 8,528,103 B2
(45) Date of Patent: *Sep. 3, 2013

(54) SYSTEM FOR MANAGING DISPLAY AND RETRIEVAL OF IMAGE CONTENT ON A NETWORK WITH IMAGE IDENTIFICATION AND LINKING TO NETWORK CONTENT

(75) Inventors: Daniel O. Ramos, Beaverton, OR (US); Brian T. MacIntosh, Lake Oswego, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 178 days.

This patent is subject to a terminal disclaimer.

(21) Appl. No.: 12/727,838

(22) Filed: Mar. 19, 2010

(65) Prior Publication Data

US 2010/0313170 A1 Dec. 9, 2010

Related U.S. Application Data

(63) Continuation of application No. 11/050,407, filed on Feb. 2, 2005, now Pat. No. 7,685,426, which is a continuation-in-part of application No. 10/112,884, filed on Mar. 29, 2002, now abandoned, which is a continuation of application No. 09/165,142, filed on Oct. 1, 1998, now Pat. No. 6,421,070.

(51) Int. Cl.
*G06F 7/04* (2006.01)
*G06F 17/30* (2006.01)
*G06F 21/00* (2006.01)
*H04L 9/32* (2006.01)

(52) U.S. Cl.
USPC .......... 726/27; 726/30; 726/32; 713/176; 713/179; 380/1; 380/54; 382/181; 382/232; 382/233; 715/255; 715/738; 715/763; 705/51

(58) Field of Classification Search
USPC .......... 713/176, 179; 380/1, 4, 54; 382/181, 382/232, 233; 715/255, 738, 763; 705/51; 726/26, 27, 30, 32
See application file for complete search history.

(56) References Cited

U.S. PATENT DOCUMENTS 5,493,677 A * 2/1996 Balogh et al. .......... 382/305
5,530,759 A * 6/1996 Braudaway et al. ....... 380/54
(Continued)

FOREIGN PATENT DOCUMENTS
EP 0 936 531 8/1999
WO WO 94/27228 11/1994

OTHER PUBLICATIONS

U.S. Appl. No. 09/343,101, filed Jun. 29, 1999, Bruce L. Davis, et al.
(Continued)

*Primary Examiner* — Edan Orgad
*Assistant Examiner* — Kari Schmidt

(57) ABSTRACT

A system manages display and retrieval of image content on a network by identifying the image and linking the image to related information, such as licensing information or usage rights. The system manages the display of image content stored within a network by associating thumbnail images that link to versions of the image content stored on a network. One example is a thumbnail that acts as a bookmark linking to image signal content stored on a distributed network of computers, such as links to web pages accessible on the internet. Corresponding methods are also provided.

23 Claims, 6 Drawing Sheets

(56) References Cited

U.S. PATENT DOCUMENTS

| | | | |
|---|---|---|---|
| 5,606,609 A * | 2/1997 | Houser et al. | 713/179 |
| 5,634,012 A | 5/1997 | Stefik | |
| 5,636,292 A * | 6/1997 | Rhoads | 382/232 |
| 5,640,193 A | 6/1997 | Wellner | |
| 5,646,997 A | 7/1997 | Barton | |
| 5,652,714 A | 7/1997 | Peterson | |
| 5,657,462 A | 8/1997 | Brouwer | |
| 5,659,726 A * | 8/1997 | Sandford et al. | 1/1 |
| 5,673,316 A | 9/1997 | Auerbach et al. | |
| 5,689,587 A * | 11/1997 | Bender et al. | 382/232 |
| 5,805,235 A | 9/1998 | Bedard | |
| 5,822,432 A | 10/1998 | Moskowitz | |
| 5,841,978 A | 11/1998 | Rhoads | |
| 5,848,424 A | 12/1998 | Scheinkman | |
| 5,852,673 A | 12/1998 | Young | |
| 5,862,260 A | 1/1999 | Rhoads | |
| 5,877,765 A | 3/1999 | Dickman et al. | |
| 5,884,056 A | 3/1999 | Steele | |
| 5,889,868 A | 3/1999 | Moskowitz | |
| 5,902,353 A | 5/1999 | Reber et al. | |
| 5,903,892 A | 5/1999 | Hoffert et al. | |
| 5,905,800 A | 5/1999 | Moskowitz et al. | |
| 5,920,861 A | 7/1999 | Hall | |
| 5,920,878 A | 7/1999 | DeMont | |
| 5,930,369 A * | 7/1999 | Cox et al. | 380/54 |
| 5,956,716 A | 9/1999 | Kenner | |
| 5,963,964 A | 10/1999 | Nielsen | |
| 6,049,627 A | 4/2000 | Becker et al. | |
| 6,122,403 A | 9/2000 | Rhoads | |
| 6,131,162 A | 10/2000 | Yoshiura et al. | |
| 6,182,218 B1 | 1/2001 | Saito | |
| 6,226,618 B1 | 5/2001 | Downs et al. | |
| 6,229,924 B1 | 5/2001 | Rhoads et al. | |
| 6,243,480 B1 | 6/2001 | Zhao | |
| 6,307,949 B1 | 10/2001 | Rhoads | |
| 6,311,214 B1 | 10/2001 | Rhoads | |
| 6,381,341 B1 | 4/2002 | Rhoads | |
| 6,385,329 B1 | 5/2002 | Sharma et al. | |
| 6,408,082 B1 | 6/2002 | Rhoads et al. | |
| 6,421,070 B1 | 7/2002 | Ramos et al. | |
| 6,424,725 B1 | 7/2002 | Rhoads et al. | |
| 6,484,943 B1 | 11/2002 | Reber et al. | |
| 6,516,079 B1 | 2/2003 | Rhoads et al. | |
| 6,522,770 B1 | 2/2003 | Seder et al. | |
| 6,526,424 B2 * | 2/2003 | Kanno et al. | 715/229 |
| 6,535,617 B1 | 3/2003 | Hannigan et al. | |
| 6,542,927 B2 | 4/2003 | Rhoads | |
| 6,553,129 B1 | 4/2003 | Rhoads | |
| 6,567,533 B1 | 5/2003 | Rhoads | |
| 6,573,916 B1 | 6/2003 | Grossweiler, III et al. | |
| 6,580,808 B2 | 6/2003 | Rhoads | |
| 6,590,996 B1 | 7/2003 | Reed et al. | |
| 6,611,607 B1 | 8/2003 | Davis et al. | |
| 6,614,914 B1 | 9/2003 | Rhoads et al. | |
| 6,647,128 B1 | 11/2003 | Rhoads | |
| 6,647,130 B2 | 11/2003 | Rhoads | |
| 6,650,761 B1 | 11/2003 | Rodriguez et al. | |
| 6,681,028 B2 | 1/2004 | Rodriguez et al. | |
| 6,681,029 B1 | 1/2004 | Rhoads | |
| 6,694,042 B2 | 2/2004 | Seder et al. | |
| 6,694,043 B2 | 2/2004 | Seder et al. | |
| 6,700,990 B1 | 3/2004 | Rhoads | |
| 6,700,995 B2 | 3/2004 | Reed | |
| 6,704,869 B2 | 3/2004 | Rhoads et al. | |
| 6,718,046 B2 | 4/2004 | Reed et al. | |
| 6,718,047 B2 | 4/2004 | Rhoads | |
| 6,721,440 B2 | 4/2004 | Reed et al. | |
| 6,760,463 B2 | 7/2004 | Rhoads | |
| 6,763,123 B2 | 7/2004 | Reed et al. | |
| 6,768,809 B2 | 7/2004 | Rhoads et al. | |
| 6,775,392 B1 | 8/2004 | Rhoads | |
| 6,798,894 B2 | 9/2004 | Rhoads | |
| 6,804,779 B1 * | 10/2004 | Carroni et al. | 713/176 |
| 6,813,366 B1 | 11/2004 | Rhoads | |
| 6,879,701 B1 | 4/2005 | Rhoads | |
| 6,917,724 B2 | 7/2005 | Seder et al. | |
| 6,920,232 B2 | 7/2005 | Rhoads | |
| 6,947,571 B1 | 9/2005 | Rhoads et al. | |
| 6,975,746 B2 | 12/2005 | Davis et al. | |
| 6,988,202 B1 | 1/2006 | Rhoads et al. | |
| 6,996,252 B2 | 2/2006 | Reed et al. | |
| 7,003,731 B1 | 2/2006 | Rhoads et al. | |
| 7,024,016 B2 | 4/2006 | Rhoads et al. | |
| 7,027,614 B2 | 4/2006 | Reed | |
| 7,035,427 B2 | 4/2006 | Rhoads | |
| 7,044,395 B2 | 5/2006 | Davis et al. | |
| 7,051,086 B2 | 5/2006 | Rhoads et al. | |
| 7,054,465 B2 | 5/2006 | Rhoads | |
| 7,062,069 B2 | 6/2006 | Rhoads | |
| 7,095,871 B2 | 8/2006 | Jones et al. | |
| 7,111,170 B2 | 9/2006 | Rhoads et al. | |
| 7,113,614 B2 | 9/2006 | Rhoads | |
| 7,139,408 B2 | 11/2006 | Rhoads et al. | |
| 7,158,654 B2 | 1/2007 | Rhoads | |
| 7,164,780 B2 | 1/2007 | Brundage et al. | |
| 7,171,016 B1 | 1/2007 | Rhoads | |
| 7,174,031 B2 | 2/2007 | Rhoads et al. | |
| 7,177,443 B2 | 2/2007 | Rhoads | |
| 7,213,757 B2 | 5/2007 | Jones et al. | |
| 7,224,819 B2 | 5/2007 | Levy et al. | |
| 7,248,717 B2 | 7/2007 | Rhoads | |
| 7,261,612 B1 | 8/2007 | Hannigan et al. | |
| 7,305,104 B2 | 12/2007 | Carr et al. | |
| 7,308,110 B2 | 12/2007 | Rhoads | |
| 7,313,251 B2 | 12/2007 | Rhoads | |
| 7,319,775 B2 | 1/2008 | Sharma et al. | |
| 7,330,564 B2 | 2/2008 | Brundage et al. | |
| 7,369,678 B2 | 5/2008 | Rhoads | |
| 7,377,421 B2 | 5/2008 | Rhoads | |
| 7,391,880 B2 | 6/2008 | Reed et al. | |
| 7,406,214 B2 | 7/2008 | Rhoads et al. | |
| 7,424,131 B2 | 9/2008 | Alattar et al. | |
| 7,427,030 B2 | 9/2008 | Jones et al. | |
| 7,433,491 B2 | 10/2008 | Rhoads | |
| 7,444,000 B2 | 10/2008 | Rhoads | |
| 7,444,392 B2 | 10/2008 | Rhoads et al. | |
| 7,450,734 B2 | 11/2008 | Rodriguez et al. | |
| 7,460,726 B2 | 12/2008 | Levy et al. | |
| 7,466,840 B2 | 12/2008 | Rhoads | |
| 7,486,799 B2 | 2/2009 | Rhoads | |
| 7,502,759 B2 | 3/2009 | Hannigan et al. | |
| 7,508,955 B2 | 3/2009 | Carr et al. | |
| 7,515,733 B2 | 4/2009 | Rhoads | |
| 7,536,034 B2 | 5/2009 | Rhoads et al. | |
| 7,537,170 B2 | 5/2009 | Reed et al. | |
| 7,545,952 B2 | 6/2009 | Brundage et al. | |
| 7,564,992 B2 | 7/2009 | Rhoads | |
| RE40,919 E | 9/2009 | Rhoads | |
| 7,602,978 B2 | 10/2009 | Levy et al. | |
| 7,628,320 B2 | 12/2009 | Rhoads | |
| 7,643,649 B2 | 1/2010 | Davis et al. | |
| 7,650,009 B2 | 1/2010 | Rhoads | |
| 7,653,210 B2 | 1/2010 | Rhoads | |
| 7,657,058 B2 | 2/2010 | Sharma | |
| 7,685,426 B2 | 3/2010 | Ramos et al. | |
| 7,693,300 B2 | 4/2010 | Reed et al. | |
| 7,697,719 B2 | 4/2010 | Rhoads | |
| 7,711,143 B2 | 5/2010 | Rhoads | |
| 7,738,673 B2 | 6/2010 | Reed | |
| 7,747,038 B2 | 6/2010 | Rhoads | |
| 7,751,588 B2 | 7/2010 | Rhoads | |
| 7,751,596 B2 | 7/2010 | Rhoads | |
| 7,756,290 B2 | 7/2010 | Rhoads | |
| 7,760,905 B2 | 7/2010 | Rhoads et al. | |
| 7,762,468 B2 | 7/2010 | Reed et al. | |
| 7,787,653 B2 | 8/2010 | Rhoads | |
| 7,792,325 B2 | 9/2010 | Rhoads et al. | |
| 7,822,225 B2 | 10/2010 | Alattar | |
| 7,837,094 B2 | 11/2010 | Rhoads | |
| 2001/0011285 A1 | 8/2001 | Kanno et al. | |
| 2001/0034705 A1 | 10/2001 | Rhoads et al. | |
| 2001/0055407 A1 | 12/2001 | Rhoads | |
| 2002/0009208 A1 | 1/2002 | Alattar et al. | |
| 2002/0033844 A1 * | 3/2002 | Levy et al. | 345/744 |

| | | | |
|---|---|---|---|
| 2002/0069218 | A1 | 6/2002 | Sull et al. |
| 2002/0076201 | A1 | 6/2002 | Tsumagari et al. |
| 2002/0131076 | A1 | 9/2002 | Davis |
| 2002/0174431 | A1 | 11/2002 | Bowman et al. |
| 2002/0176003 | A1 | 11/2002 | Seder et al. |
| 2002/0186886 | A1 | 12/2002 | Rhoads |
| 2002/0196272 | A1 | 12/2002 | Ramos et al. |
| 2003/0040957 | A1 | 2/2003 | Rodriguez et al. |
| 2003/0105730 | A1 | 6/2003 | Davis et al. |
| 2003/0128862 | A1* | 7/2003 | Decker et al. ............ 382/100 |
| 2003/0130954 | A1 | 7/2003 | Carr et al. |
| 2004/0005093 | A1 | 1/2004 | Rhoads |
| 2004/0190750 | A1 | 9/2004 | Rodriguez et al. |
| 2004/0240704 | A1 | 12/2004 | Reed |
| 2004/0264733 | A1 | 12/2004 | Rhoads et al. |
| 2005/0041835 | A1 | 2/2005 | Reed et al. |
| 2005/0044561 | A1 | 2/2005 | McDonald |
| 2005/0058318 | A1 | 3/2005 | Rhoads |
| 2005/0192933 | A1 | 9/2005 | Rhoads et al. |
| 2006/0013435 | A1 | 1/2006 | Rhoads |
| 2006/0041591 | A1 | 2/2006 | Rhoads |
| 2006/0251291 | A1 | 11/2006 | Rhoads |
| 2007/0055884 | A1 | 3/2007 | Rhoads |
| 2007/0108287 | A1 | 5/2007 | Davis et al. |
| 2007/0116317 | A1 | 5/2007 | Ozawa |
| 2007/0154064 | A1 | 7/2007 | Rhoads et al. |
| 2007/0276841 | A1 | 11/2007 | Rhoads et al. |
| 2007/0276928 | A1 | 11/2007 | Rhoads et al. |
| 2008/0049971 | A1 | 2/2008 | Ramos et al. |
| 2008/0121728 | A1 | 5/2008 | Rodriguez |
| 2008/0133555 | A1 | 6/2008 | Rhoads et al. |
| 2008/0292134 | A1 | 11/2008 | Sharma et al. |
| 2009/0012944 | A1 | 1/2009 | Rodriguez et al. |
| 2009/0116687 | A1 | 5/2009 | Rhoads et al. |
| 2009/0125475 | A1 | 5/2009 | Rhoads et al. |
| 2009/0138484 | A1 | 5/2009 | Ramos et al. |
| 2009/0144321 | A1 | 6/2009 | Shamma |
| 2009/0232352 | A1 | 9/2009 | Carr et al. |
| 2009/0286572 | A1 | 11/2009 | Rhoads et al. |
| 2009/0290754 | A1 | 11/2009 | Rhoads |
| 2010/0027837 | A1 | 2/2010 | Levy et al. |
| 2010/0045816 | A1 | 2/2010 | Rhoads |
| 2010/0062819 | A1 | 3/2010 | Hannigan et al. |
| 2010/0094639 | A1 | 4/2010 | Rhoads |
| 2010/0142749 | A1 | 6/2010 | Rhoads et al. |
| 2010/0172540 | A1 | 7/2010 | Davis et al. |
| 2010/0198941 | A1 | 8/2010 | Rhoads |
| 2011/0007936 | A1 | 1/2011 | Rhoads |
| 2011/0026777 | A1 | 2/2011 | Rhoads et al. |
| 2011/0051998 | A1 | 3/2011 | Rhoads |

OTHER PUBLICATIONS

U.S. Appl. No. 09/343,104, filed Jun. 29, 1999, Tony F. Rodriguez, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/507,096, filed Feb. 17, 2000, Geoffrey B. Rhoads, et al.
U.S. Appl. No. 09/552,998, filed Apr. 19, 2000, Tony F. Rodriguez, et al.
U.S. Appl. No. 09/567,405, filed May 8, 2000, Geoffrey B. Rhoads, et al.
U.S. Appl. No. 09/629,649, filed Aug. 1, 2000, J. Scott Carr, et al.
U.S. Appl. No. 09/633,587, filed Aug. 7, 2000, Geoffrey B. Rhoads, et al.
U.S. Appl. No. 09/689,289, filed Oct. 11, 2000, Geoffrey B. Rhoads, et al.
U.S. Appl. No. 60/466,926, filed Apr. 30, 2003, Alastair M. Reed, et al.
U.S. Appl. No. 09/538,493, filed Mar. 30, 2000, Geoffrey B. Rhoads.
U.S. Appl. No. 09/697,009, filed Oct. 25, 2000, Bruce L. Davis, et al.
U.S. Appl. No. 09/697,015, filed Oct. 25, 2000, Bruce L. Davis, et al.
U.S. Appl. No. 12/912,461, filed Oct. 26, 2010, Adnan M. Alattar.
IBM Technical Disclosure Bulletin, "Efficient 3D method for Displaying Browser Uniform Resource Locator Bookmarks" Jan. 1, 1998.
Digimarc corporation "Digimarc Turns Online Images into Powerful Marketing Agents," pp. 1-3, Jun. 1998.
Rauber, "Secure Distribution of Watermarked Images for a Digital Library of Ancient Papers", Proceedings of the 2nd ACM international conference on digital libraries, pp. 123-130, Jul. 1997.
Digimarc corporation, "A Picture Says a Thousand Words-Two of Them Can Now Be Your First and Last Names" Sep. 1997.
Digimarc Corporation, "Digimarc Kicks Off MarcSpider Service" pp. 1-2, Aug. 1997.
Ayers, Eric and Stasko, John, "Using Graphic History in Browsing the World Wide Web," Proceedings of the Fourth International World Wide Web Conference, Dec. 1995.
Abrams, "Information Archiving with Bookmarks: Personal Web Space Construction and Organization", Proceedings ACM SIGCHI '98, 41-48.
Card, "The WebBook and the Web Forager: an Information Workspace for the World-Wide Web", Proceedings of the SIGCHI, Conference on Human Factors in Computing Systems, 1996.
Li, "Improving Relevance Judgment of Web Search Results with Image Excerpts", WWW 2008/Refereed Track: Browsers and User Interfaces, Apr. 21-25, 2008, pp. 21-30.
Hightower, "Graphical Multiscale Web Histories: a Study of PadPrints", ACM Hypertext 98 conference, 8 pages.
Arai, InteractiveDESK: A Computer-Augmented Desk Which Responds to Operations on Real Objects, CHI 95, May 7-11, 1995, 2 pages.
Arai et al, "Retrieving Electronic Documents with Real-World Objects on InteractiveDESK," UIST '95, Nov. 14-17, 1995, pp. 37-38.
Ayatsuka, et al., UbiquitousLinks, IPSJSIG Notes, vol. 96, No. 62, Jul. 11, 1996, pp. 23-30 (abstract only); printed on Mar. 17, 2006 from http://www-masuda.is.s.u-tokyo.ac.jp/~aya/works/UbiLink.html.
Aust, D., "Augmenting Paper Documents with Digital Information in a Mobile Environment," MS Thesis, University of Dortmund, Department of Computer Graphics, Sep. 3, 1996, 46 pages.
Arai, et al. "PaperLink: A Technique for Hyperlinking from Real Paper to Electronic Content," CHI 97, Mar. 22-27, 1997, pp. 327-334.
Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, 15 pages.
Want, "Bridging Physical and Virtual Worlds with Electronic Tags," CHI 99, May 15-20, 1999, pp. 370-377.
Heiner et al, Linking and messaging from real paper in the Paper PDA, ACM Symposium on User Interface Software andTechnology, UIST '99, Nov. 7-10, 1999, pp. 179-186.
Rekimoto, et al., "CyberCode: Designing Augmented Reality Environments with Visual Tags," DARE 2000, Apr. 12, 2000, pp. 1-10.
"Distributing Uniform Resource Locators as Bar Code Images," IBM Technical Disclosure Bulletin, , pp. 167-168, vol. 39, No. 196A 60059, published Jan. 96.
U.S. Appl. No. 09/507,096, Davis, filed Feb. 17, 2000.
U.S. Appl. No. 60/191,778, Ramos, filed Mar. 24, 2000.
U.S. Appl. No. 09/636,102, Ramos, filed Aug. 10, 2000.
U.S. Appl. No. 09/531,078, Rhoads, filed Mar. 18, 2000.

* cited by examiner

Display Screen

SYSTEM FOR MANAGING DISPLAY AND RETRIEVAL OF IMAGE CONTENT ON A NETWORK WITH IMAGE IDENTIFICATION AND LINKING TO NETWORK CONTENT

RELATED APPLICATION

This application is a continuation of application Ser. No. 11/050,407, filed Feb. 2, 2005 (U.S. Pat. No. 7,685,426), which is a continuation in part of application Ser. No. 10/112,884, filed Mar. 29, 2002 (published as US 2002-0196272 A1), which is a continuation of application Ser. No. 09/165,142, filed Oct. 1, 1998 (U.S. Pat. No. 6,421,070). This patent application is also related to: application Ser. No. 08/746,613, filed Nov. 12, 1996 (U.S. Pat. No. 6,122,403); application Ser. No. 09/972,792, filed Oct. 5, 2001 (published as US 2005-0058313 A1); application Ser. No. 09/612,177, filed Jul. 6, 2000 (U.S. Pat. No. 6,681,029); application Ser. No. 08/746,613, filed Nov. 12, 1996 (U.S. Pat. No. 6,122,403); application Ser. No. 08/649,419, filed May 16, 1996 (U.S. Pat. No. 5,862,260); and PCT/US96/06618, filed May 7, 1996 (published as WO 96/36163). The above patents and patent applications are hereby incorporated by reference.

FIELD OF THE INVENTION

The invention relates to managing, identifying, indexing, and linking to content, and particularly image signals, on networks, such as web pages on the Internet.

BACKGROUND AND SUMMARY OF THE INVENTION

There are numerous commercially available programs called "browsers" that facilitate accessing and displaying data. The two leading commercially available browsers are the "Netscape Communicator" which is distributed by Netscape Corporation of Mountain View, Calif. and the "Internet Explorer" browser that is distributed by Microsoft corporation of Redmond, Wash.

Browsers allow one to utilize the internet to access web pages located at remote sites. A browser displays web pages in a window on a display device. The web pages that are displayed can contain both text and images.

Technology called stegangraphy had been developed which allows one to store digital data in an image. Such data is frequently termed a "digital watermark". The digital data is not visible when an image containing such data is displayed with a conventional browser; however, the image can be passed through a special program which can detect and read the hidden data. Systems for storing digital data in images and for then reading such data from the images are for example shown in U.S. Pat. No. 5,636,292 and in U.S. Pat. No. 5,748,783. Such technology is also discussed in the "Communications of the ACM" published July 1998 Vol. 41. No. 7 pages 31 to 77.

The following disclosure describes programs that work with a browser to provide functions that are not performed by prior programs. A typical web page displayed by a browser contains several images. With a conventional browser, a user can not visually determine if any of the images displayed on a web page contain a watermark, and cannot create and use image bookmarks.

One method described in this disclosure is a method of managing content, and in particular, managing content on the Internet. The method retrieves a web page that includes an image and detects whether the image included within the web page is embedded with a digital watermark. It generates an indicia associated with an image included in the web page that is embedded with a digital watermark. The indicia indicate to the user which images include watermarks. The watermarks may be used to convey links to related web pages or specific information about the images, such as usage rights and licensing information. Variations of this method create image bookmarks to web pages including images using thumbnails of those images.

Another aspect of the disclosure is a system for managing content. The system comprises a first program for retrieving web pages including images. It also includes a second program for extracting an image from a web page, creating a thumbnail of the image, and forming an image bookmark linking the thumbnail to the web page that the image has been extracted from. The thumbnails are used to create a visual index to corresponding web pages from which the images originated on the Internet, for example.

Another aspect of the disclosure is a method of visual indexing of content on a network, such as the Internet. The method retrieves a web page, extracts an image included on the web page, generates a thumbnail of the image, and creates a link between the thumbnail and a location of the web page from which the image has been extracted.

One embodiment is implemented as an adjunct to a convention browser which displays web pages including images. In this embodiment, visual indicia is placed on images that include a digital watermark so that a user can know that the image contains hidden watermark data. By clicking on the indicia which is placed on the image, the user will be linked to the web page identified by the watermark data hidden in the image. In this embodiment, such a link can be established without the web page designer having to include a tag in the web page which displays the original image. This embodiment also opens a separate window depicting a thumbnail of each image in a web page. If a user right clicks on one of the thumbnails in this window the image will be added to a list of images in a special image bookmark file. When a user opens the bookmark web page, thumbnails of all the stored images in the bookmark file are displayed. A user can recall the web page which originally contained the image by clicking on the thumbnail.

Another aspect of the disclosure is a system comprising: a memory; and a processor in communication with the memory and programmed to retrieve an image signal. The processor is programmed to compute identifying information from the image signal, and to associate the identifying information with a link to additional information related to the image signal. The processor is also programmed to create a thumbnail of the image signal, and programmed to form an image bookmark linking the thumbnail to a network location where the image signal is stored.

Yet another aspect of the disclosure is a method comprising: retrieving an image signal; using a programmed processor, computing identifying information from the image signal; associating the identifying information with a link to additional information related to the image signal; creating a thumbnail of the image signal; forming an image bookmark linking the thumbnail to a network location where the image signal is stored.

DETAILED DESCRIPTION

Figure 1:
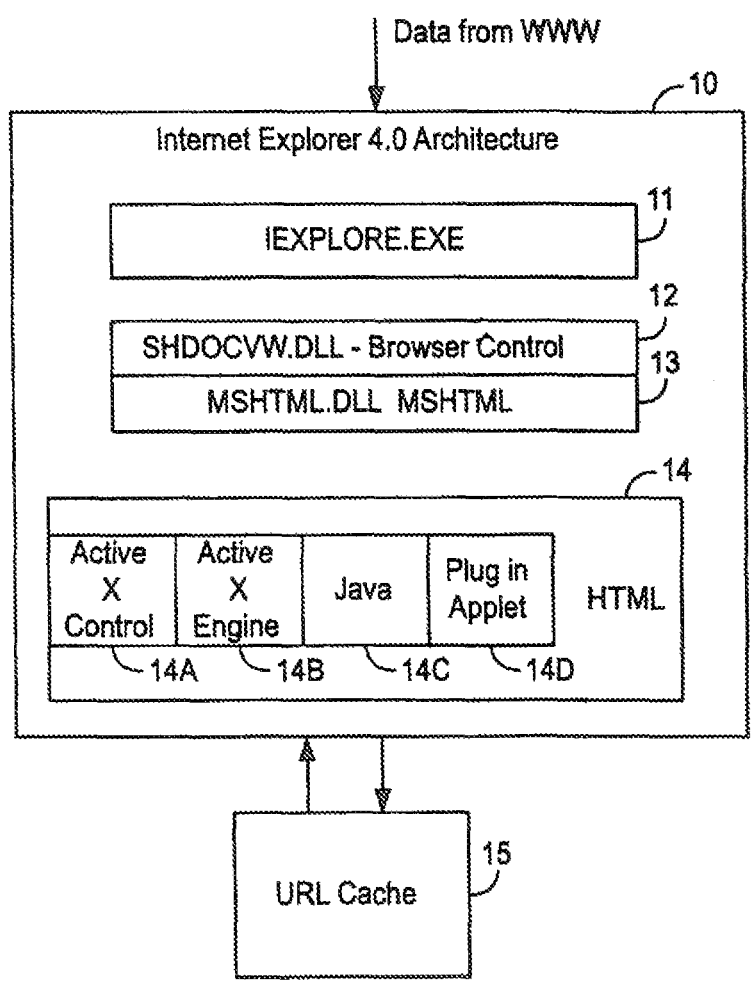
FIG. 1 is a block diagram of a browser.

An embodiment is implemented utilizing what is known in the art as "helper application" for the Internet Explorer 4.0 browser. The Internet Explorer 4.0 browser is commercially distributed by Microsoft Corporation. FIG. 1 is a block diagram of the commercially available Internet Explorer 4.0 browser 10. Browser 10 provides a mechanism for receiving and displaying data (called Web Pages) received from the World Wide Web (which is often referred to as W W W).

The embodiment described herein is designed to operate based on watermarks which have a particular format designed by Digimarc Corporation. Many of the commercially available programs which can insert watermarks in images and which can detect watermarks in images utilize this watermark format. For example, the Digimarc format is used by the following commercially available programs: "Adobe PhotoShop" Versions 4.0 and 5.0 and "Adobe ImageReady" Version 1.0 which are marketed by Adobe Corporation, "CorelDRAW" Versions 7 and 8, and "Corel PHOTO-PAINT" Versions 7 and 8 which are marketed by Corel Corporation, and Micrografx Webtricity" Versions 1 and 2, "Micrografx Graphics Suite 2", and "Micrografx Picture Publisher" Versions 7 and 8 which are marketed by Micrografx Corporation.

The base program in the Internet Explorer 4.0 browser, that is, the program which begins the operation of the browser 10 is IEXPLORE.EXE 11 which is shown in FIG. 1. Program 11 calls the web browser control dynamic link library SHDOCVW.DLL 12. As stated in the documentation of the Internet Explorer provided by Microsoft SHDOCVW.DLL 12 "supplies the functionality associated with navigation, in-place linking, favorites and PICS support." SHDOCVW.DLL 12 in turn hosts or calls the MSHTML.DLL 13 dynamic link library. MSHTML.DLL "performs the HTML parsing and rendering" and also "exposes the HTML document through the Dynamic HTML Object Model" 14. The HTML Object Model 14 hosts the Active X Control 14A, the Active X Engine 14B, the JAVA VM 14C and the Plug In Applet 14D. The various components in browser 10 store and retrieve information from URL Cache 15. The operation and function of the various components of the Internet Explorer browser are described in the publicly available literature (and on the web site) provided by Microsoft Corporation.

Figure 2:
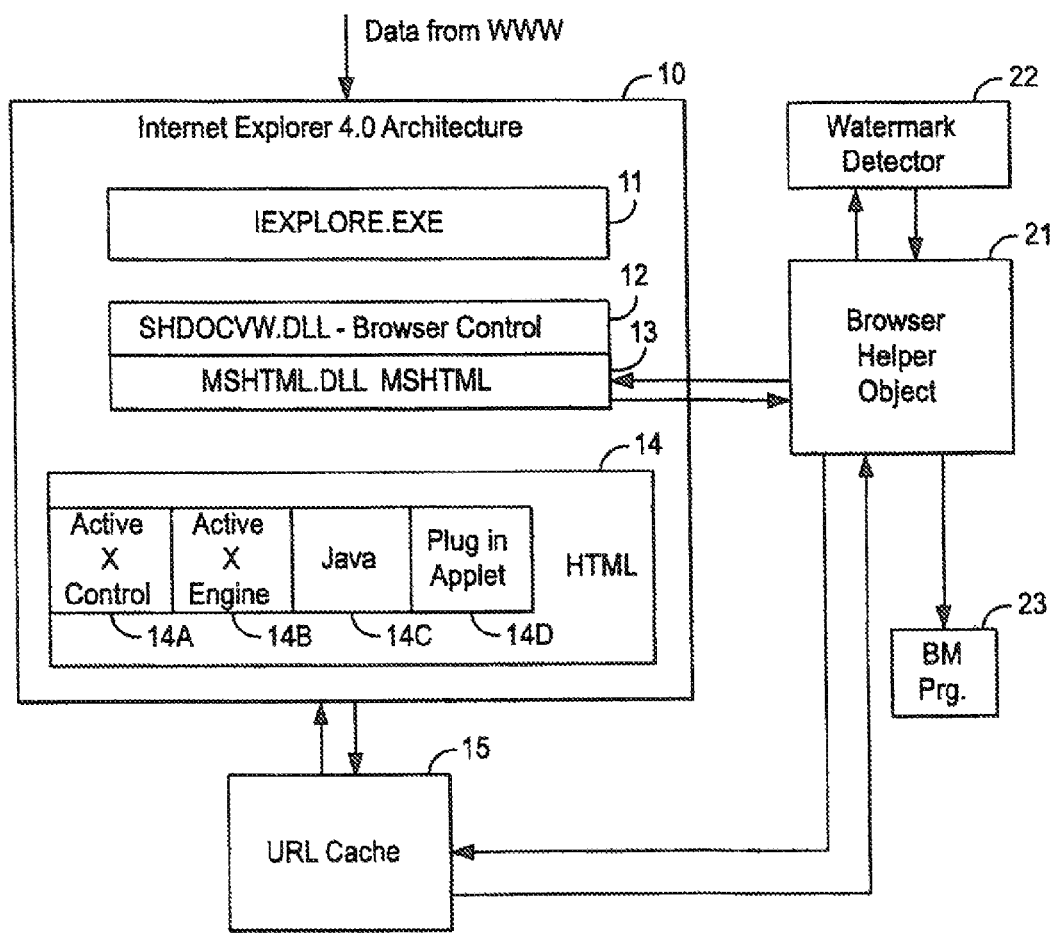
FIG. 2 is a block diagram of an embodiment.

An embodiment adds a browser helper object 21 and two other programs 22 and 23 as shown in FIG. 2. Program 22 is a conventional program designed to detect a watermark in an image. One example of such a program is shown in U.S. Pat. No. 5,636,292. Another program for detecting watermarks is shown in U.S. Pat. No. 5,689,587. The browser helper object 21 interfaces with the dynamic link library MSHTML.DLL 13 and with the URL cache 15.

Figure 4:
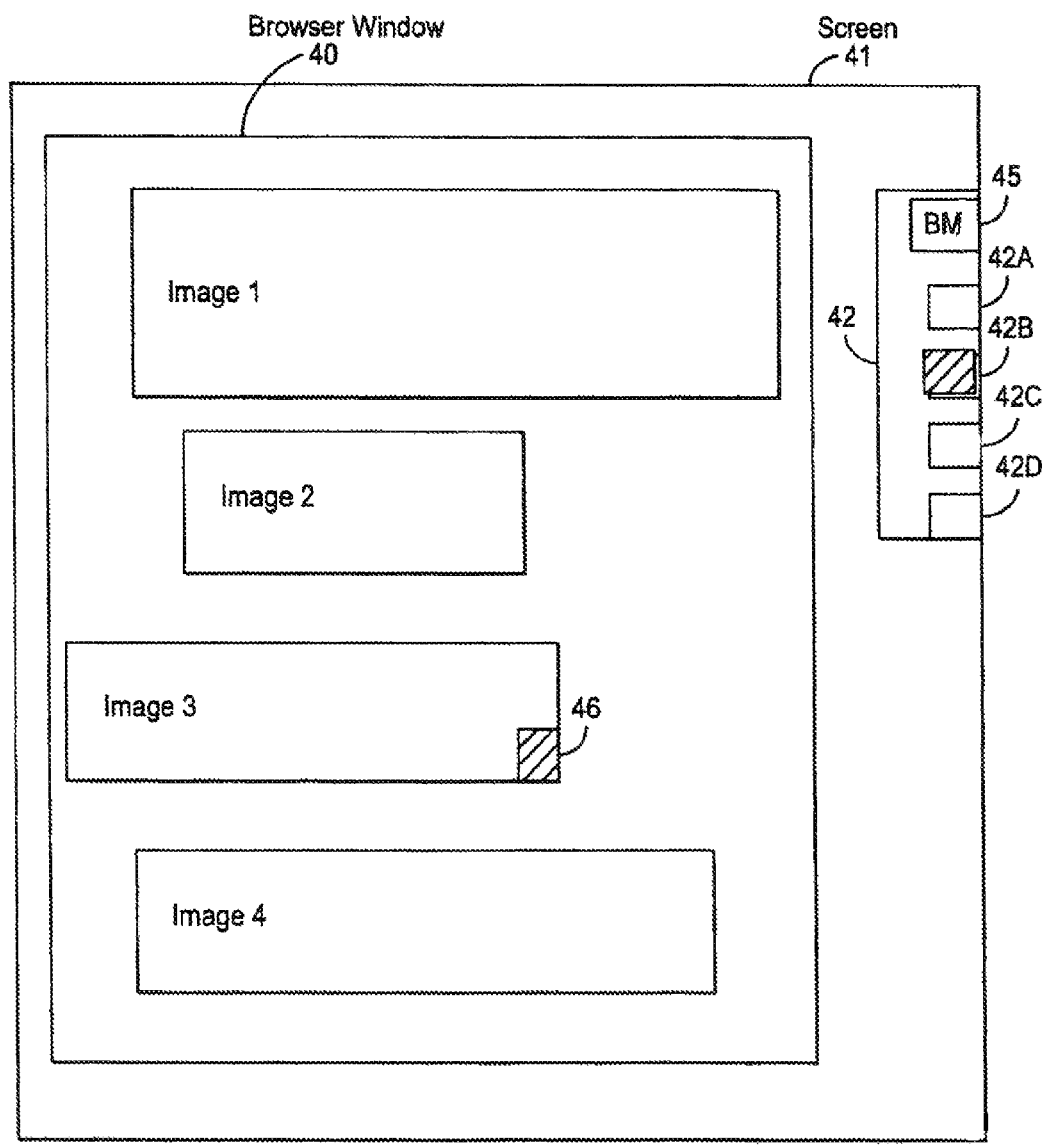
FIG. 4 is a diagram of a display screen of the preferred embodiment.

FIG. 4 illustrates an example of a web page being displayed in a window 40 on display screen 41 by browser 10. The example shown in FIG. 4 has four images designated image 1, image 2, image 3 and image 4. It should understood that the number of images and the placement of the images varies in each web page displayed and it is determined by the person who creates a web page. Furthermore, text may be interspersed with the images. The example shown in FIG. 4 is a simple example of a web page which is herein used to illustrate the operation of an embodiment.

The embodiment detects which images on a web page contain a watermark. The images which contain watermarks are flagged or noted by means of an indicia which is added to the lower right hand corner of any images that contain watermarks. In the example shown in FIG. 4, image 3 contains a watermark and thus indicia 46 appears on the lower right hand corner of the image. Indicia 46 could for example be a logo which identifies a particular company or it could be any other easily identified mark or symbol. It could be as simple as the letters WM or it could be a small multicolored image. The indicia which is displayed is stored in GIF file (Graphic Interchange Format file) and referenced by HTML code (HyperText Markup Language code) which causes the indicia to be displayed.

The data in the watermarks (which have the previously defined format) includes a particular HTML address. In the embodiment, if a user clicks on the indicia 46, a link is created and executed to a particular web page on a particular server herein identified as "www.digimarc.com/cgi-bin".

The program 20 also opens a separate window 42 and it places a thumbnail (i.e. a reduced version) of each image in window 42. In the example shown in FIG. 4, thumbnails 42A, 42B, 42C and 42D are small versions of images 1 to 4 respectfully.

Figure 5:
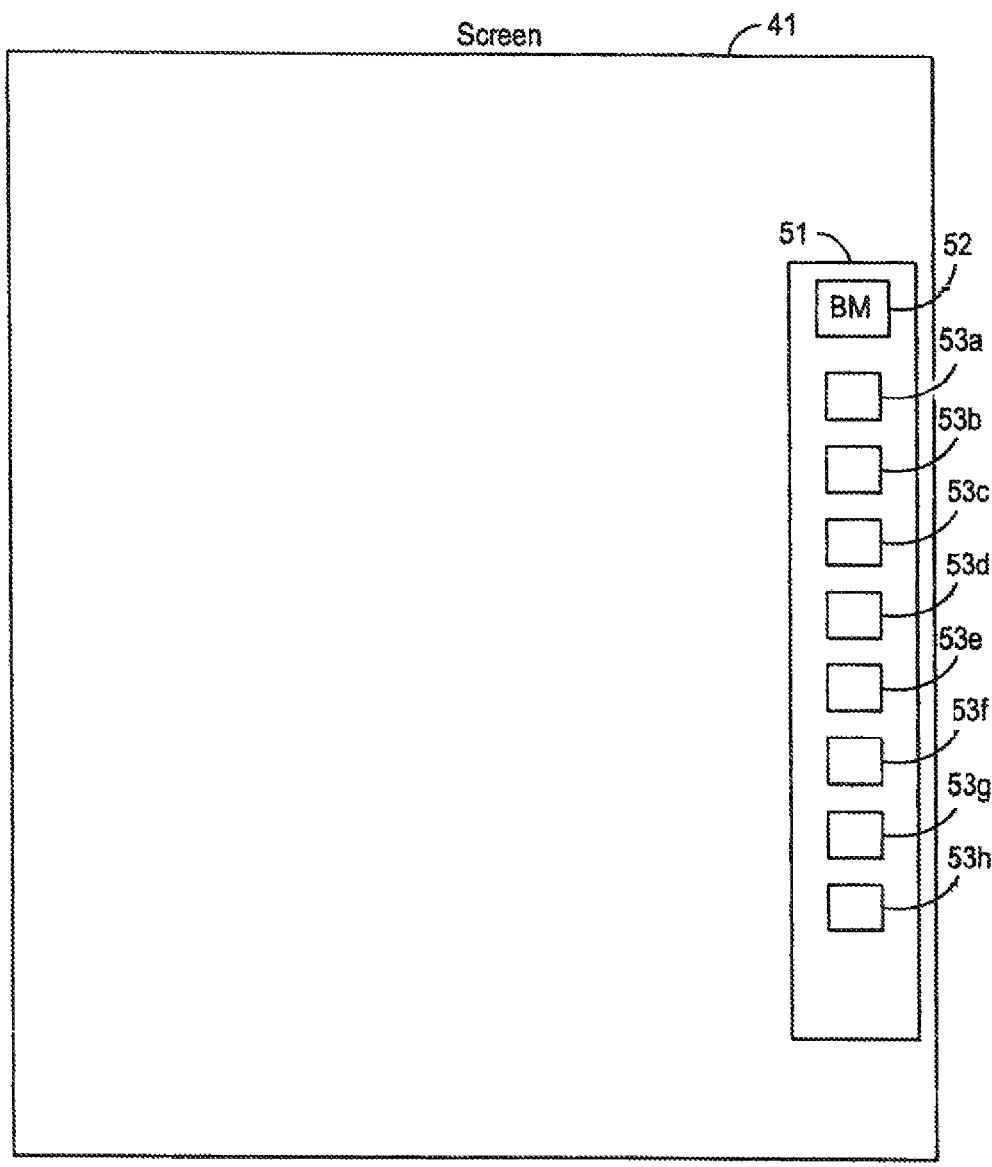
FIG. 5 is a diagram of a display screen showing bookmarks.

Program 20 also creates an image or "button" 45 which contains the symbol BM. If a user right clicks on one of the images in window 42, that image is saved as a bookmark. If at a later time a user clicks on the BM image 45, the system displays a list of the previously saved images 53a to 53h as shown in FIG. 5. When a user clicks on one of the displayed images 53a to 53h, a link is executed to the page from which the image originated, and thus that page is again displayed by the browser 10.

Figure 3:
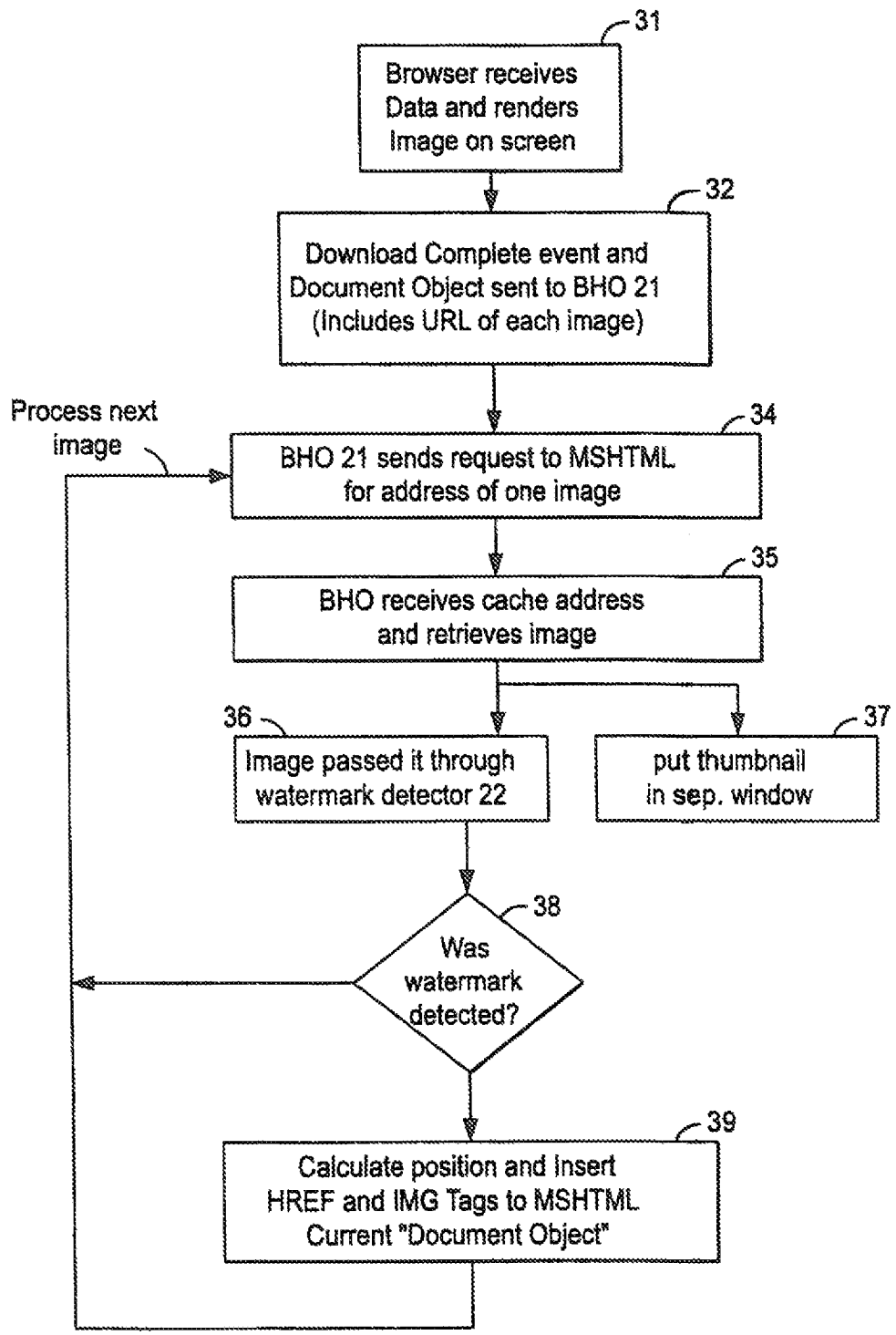
FIG. 3 is flow diagram of the operation of the preferred embodiment.

FIG. 3 is a block flow diagram of the operation of the browser helper object 21 and program 22. Block 31 indicates that initially the browser 10 receives data and it renders images in window 40 on the screen 41 as is normal for the operation of the browser 10. Block 32 indicates that when the download operation is complete, MSHTML.DLL 13 sends a "Download complete event" and a "Document Object" to Browser helper Object 21. The Document Object includes the URL addresses of each of the images in the page that is displayed. The characteristics of a Download Complete Event and a Document Object is explained in the documentation provided by Microsoft Corporation. Block 34 indicates that Browser Helper 21 sends a request to MSHTML for the address in cache 15 of one of the URL addresses which it previously received. The documentation supplied by Microsoft corporation explains how the above operations are performed.

Block 35 indicates that when browser helper 21 receives a Download Compete Event from MSHTML.DLL 13, the browser helper 21 queries the "Document Object". The images which are in the page being displayed are available to the browser helper 21 in the current "Document". The browser helper 21 retrieves the image data from the URL cache 15 and processes it as follows: The image is passed through watermark detector program 22 to determine if the image contains a watermark and bookmark program 23 places a thumbnail of the image in window 32.

As indicated by block 38, if no watermark is detected (and if this is not the last image which appears in the window being displayed) the program flow returns to block 34 and the process repeats for another image. If the image being processed is the last image in a window the process stops and does not begin again until browser helper 21 receives another "download Compete Event" signal.

If a watermark is detected by watermark detector 22, the process proceeds to block 39. As indicated by block 39, in this event helper Program 21 calculates the position of the lower right hand corner of the image and "inserts" a HREF and an IMG tag to the current document object of MSHTML.DLL. In response to the HREF and IMG tag, MSHTML.DLL will display an indicia such as indicia 46 in the lower right hand corner of the image with the watermark. The browser helper can calculate the lower right hand corner of the image where the indicia 46 is to be inserted from the location data of the image. The location where the image is to be inserted is given in the HREF command. The following is an example of and HREF and IMG tags:

```
<a href="http://www.digimarc.com/cgi-bin/c1.p1?4+404407+0.0.+1."
<IMG SRC='ind46.gif' STYLE=
"position:absolute;left:125;top:200;filter;alpha(opacity)">
</a>
``` where: ind46.gif is a GIF image of the indicia 46.

The general format of such HREF and IMG tags is conventional. Likewise the technique for "inserting" a HREF and an IMG tag to the current document object of MSHTML.DLL is known.

When watermark detector 22 determines that a particular image contains a watermark, the browser helper 21 inserts tags such as the above to the MSHTML.DLL 13 which then superimposes indicia 46 over the image being displayed by the browser 10.

An Active X browser control program publicly available from Microsoft Corporation is used to display the thumbnails in window 42 as shown in FIG. 4. The Active X browser control program is also used to display the image bookmarks as shown in FIG. 5. A specific example of image HTML used to display thumbnails in window 42 using an Active X browser control is given below.

```
<table width= 72>
<tr><a href='http://safari.altavista.digital.com/cgi-bin/VP?START=1'
title='http://safari.altavista.digital.com/cgi-bin/VP?START=1'><font
size=1 color='blue' face='Verdana,Arial,Helvetica'> <P
onmouseover="this.style.color = 'red'"; onmouseout=
"this.style.color = 'blue'">Corbis Picture Experience - AltaVista -
BETA TEST<P>
</font></a></tr>
</table>
<table cellspacing='1' cellpadding='1', border='0' width='72'>
<tr>
    <td rowspan='2' ><a
href='http://safari.altavista.digital.com/cgi-bin/VP?START=1'><img
src="http://safari.altavista.digital.com/Assets/coravcpe.gif"
border='0'
title='http://safari.altavista.digital.com/Assets/coravcpe.gif'
border='0'
height='30' width='70'></a>
</td>
        <td></td>
</tr>
<tr>
        <td></td>
</tr>
<tr>
```

```
    <td rowspan='2' ><a
href='http://safari.altavista.digital.com/cgi-bin/VP?START=1'><img
src="http://safari.altavista.digital.com/Assets/coravtitle.gif"
border='0'
title='http://safari.altavista.digital.com/Assets/coravtitle.gif'
border='0'
height='50' width='70'></a>
</td>
        <td></td>
</tr>
<tr>
        <td></td>
</tr>
<tr>
    <td rowspan='2' ><a
href='http://safari.altavista.digital.com/cgi-bin/VP?START=1'><img
src="http://safari.altavista.digital.com/Assets/corav123.gif"
border='0'
title='http://safari.altavista.digital.com/Assets/corav123.gif'
border='0' height='52' width='37'></a>
</td>
        <td></td>
</tr>
<tr>
        <td></td>
</tr>
<tr>
</table>
```

The above example includes three images. The brackets at the right hand side of the above code indicate the sections of code which display each image. When in use, the number of images equals the number of images on a particular web page which is being displayed.

Figure 6:
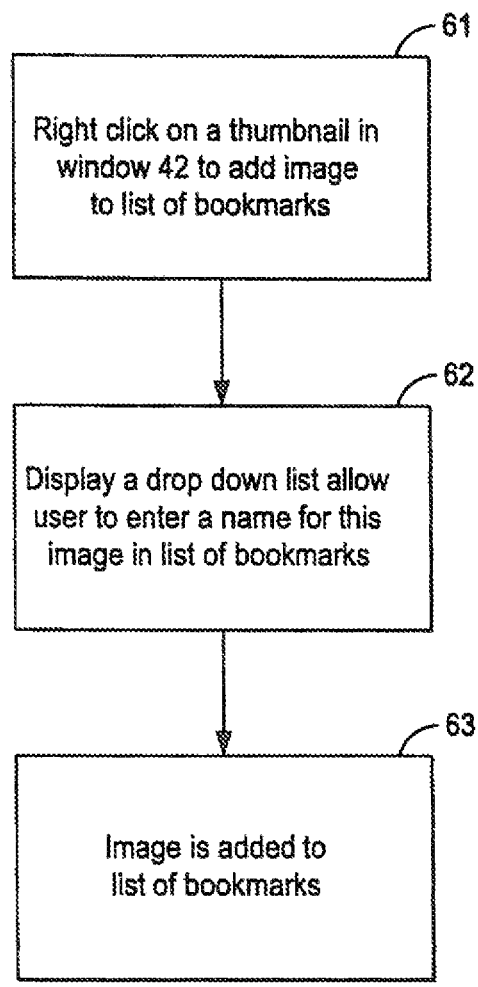
FIG. 6 is a flow diagram of the operation of the bookmark program.

A block diagram of the program used to add images to the list of image bookmarks is shown in FIG. 6. With reference to FIG. 4, if a user would like to add one of the images 1 to 4 to a list of images that the user has bookmarked, the user would right clicks on the thumbnail of that image which shown in window 42 (block 61). As a result of the right click, a drop down window (not specifically shown) will appear asking for the name the user wants to associate with the image (block 62). It is noted that the use of drop down windows to add information is conventional and well known. When the drop down window appears, the user enters a name and the image is added to the list of bookmarks with the name entered.

Similar HTML code to that given above is used with the Active X Browser control to display bookmarks as shown in FIG. 5. The following is an example of HTML code which displays bookmarks as shown in in FIG. 5. Such HTML is conventional and many alternative sequences of HTML can be used to generate a similar page of images.

```
<html>
<head>
<title>Digimarc Watermark Explorer Bookmark</title>
<body vlink='blue' link='blue'>
<table width= 100 align='center'>
<tr>
<td><a href='http://www.cnn.com/' name='Bookmark_C'><font
size=1 color='blue' face='Verdana,Arial,Helvetica'><U
onmouseover="this.style.color= 'red'";
onmouseout="this.style.color =
'blue'"; >CNN Interactive</U>
</font></a></td></tr>
<tr>
<td width='100' align='center'>
<a href='http://www.cnn.com/'><img
src="http://www.cnn.com/images/1998/05/homepage/cnnin.logo.gif"
alt='http://www.cnn.com/' border='0' height='52' width='70'></a>
</td>
```

-continued

```
</tr>
</table>
<table width= 100 align='center'>
<tr>
<td><a href=" name='Bookmark_M'><font size=1 color='blue'
face='Verdana,Arial,Helvetica'><U onmouseover=
"this.style.color = 'red'";
onmouseout="this.style.color = 'blue'"; >Microsoft Inyestor</U>
</font></a></td></tr>
<tr>
<td width='100' align='center'>
<a href=""><img
src="http://investor.msn.com/common/images/invlogo.gif" alt="
border='0' height='48' width='70'></a>
</td>
</tr>
</table>
<table width= 100 align='center'>
<tr>
<td><a href=" name='Bookmark_P'><font size=1 color='blue'
face='Verdana,Arial,Helvetica'><U onmouseover="this.style.color =
'red'"; onmouseout="this.style.color = 'blue'"; >PC World</U>
</font></a></td></tr>
<tr>
<td width='100' align='center'>
<a href=""><img
src="http://www.idg.net/channels/ie4/english/images/idg_logo.gif"
alt=" border='0' height='52' width='70'></a>
</td>
</tr>
</table>
</body>
</html>
```

The brackets to the right of the above HTML show the sections of HTML used to display one bookmark. Naturally it should be understood that the above is merely an example of one particular set of HTML that can be used to display a list of bookmarks. Various other sequences of code can be used to obtain similar functions. HTML code such as that shown above is conventional and widely used.

Another feature that can be added to the preferred embodiment is that window 42 can be used to display a visual history of the pages that have been viewed. That is one could include in window 42 a button that would allow one to scroll back through the thumbnails previously displayed in the window.

While the invention has been showed with respect to a preferred embodiment thereof, it should be understood that various changes and modifications can be made without departing from the spirit of the invention. The scope of applicant's invention is defined by the following claims.

What is claimed is:

1. A system comprising:
a memory; and
a processor in communication with the memory configured to:
retrieve an image signal;
compute identifying information from the image signal;
associate the identifying information with a link to additional information related to the image signal;
create a thumbnail of the image signal; and
form an image bookmark linking the thumbnail to a network location where the image signal is stored.

2. The system of claim 1, wherein the processor is configured to detect a digital watermark in the image signal, wherein the digital watermark provides the identifying information linking the image signal to additional information on a network.

3. The system of claim 1, wherein the processor is configured to generate graphical indicia indicating that the image signal is linked to the additional information.

4. The system of claim 3, wherein the additional information comprises a web page.

5. The system of claim 4, wherein the web page provides usage rights for the image signal.

6. The system of claim 4, wherein the web page provides licensing information for the image signal.

7. The system of claim 1, wherein the processor is configured to generate indicia for an image signal in which a digital watermark is detected, wherein the indicia serves to identify that the image signal includes a digital watermark.

8. The system of claim 1, wherein the processor is configured to extract the image signal from a web page.

9. The system of claim 8, wherein the processor is configured to provide a user interface including a display of a web page in a first window and a thumbnail of an image signal in the web page in a second window.

10. The system of claim 9, wherein the thumbnail of the image signal is annotated with indicia when a digital watermark is detected in the image.

11. The system of claim 1, wherein the processor is configured to maintain and display a list of thumbnails as image bookmarks linking the thumbnails to corresponding image signals at network locations where the image signals are stored.

12. A method comprising:
retrieving an image signal;
computing, using a processor, identifying information from the image signal by detecting a digital watermark in the image signal, wherein the digital watermark provides the identifying information;
associating the identifying information with a link to additional information related to the image signal;
creating a thumbnail of the image signal; and
forming an image bookmark linking the thumbnail to a network location where the image signal is stored.

13. The method of claim 12, wherein computing identifying information comprises detecting a digital watermark in the image signal, wherein the digital watermark provides the identifying information linking the image signal to additional information on a network.

14. The method of claim 12, further comprising generating graphical indicia indicating that the image signal is linked to the additional information.

15. The method of claim 14, wherein the additional information comprises a web page.

16. The method of claim 15, wherein the web page provides usage rights for the image signal.

17. The method of claim 15, wherein the web page provides licensing information for the image signal.

18. The method of claim 12, further comprising generating indicia for an image signal in which a digital watermark is detected, wherein the indicia identifies that the image signal includes a digital watermark.

19. The method of claim 12, further comprising extracting the image signal from a web page.

20. The method of claim 19, further comprising providing a user interface including a display of a web page in a first window and a thumbnail of an image signal in the web page in a second window.

21. The method of claim 20, wherein the thumbnail of the image signal is annotated with indicia when a digital watermark is detected in the image.

22. The method of claim 12, further comprising maintaining and displaying a list of thumbnails as image bookmarks linking the thumbnails to corresponding image signals at network locations where the image signals are stored.

23. A non-transitory computer-readable medium having instructions stored thereon, the instructions comprising:
- instructions to retrieve an image signal;
- instructions to compute identifying information from the image signal by detecting a digital watermark in the image signal, wherein the digital watermark provides the identifying information;
- instructions to associate the identifying information with a link to additional information related to the image signal;
- instructions to create a thumbnail of the image signal; and
- instructions to form an image bookmark linking the thumbnail to a network location where the image signal is stored.

* * * * *

UNITED STATES PATENT AND TRADEMARK OFFICE
CERTIFICATE OF CORRECTION

| | | |
|---|---|---|
| PATENT NO. | : 8,528,103 B2 | Page 1 of 1 |
| APPLICATION NO. | : 12/727838 | |
| DATED | : September 3, 2013 | |
| INVENTOR(S) | : Ramos et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 346 days.

Signed and Sealed this
Twenty-fourth Day of December, 2013

Margaret A. Focarino
*Commissioner for Patents of the United States Patent and Trademark Office*